Figure 1:
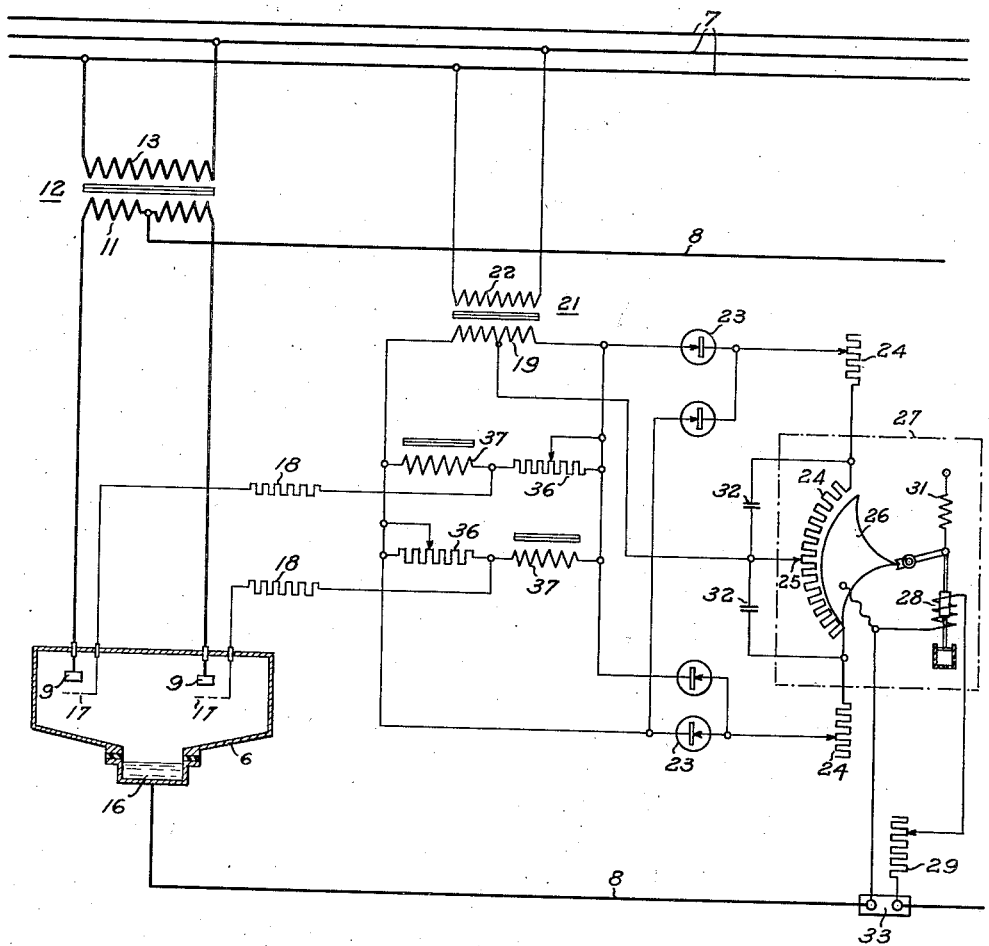

May 25, 1937.  H. WINOGRAD  2,081,844
ELECTRIC VALVE CONTROL SYSTEM
Filed Sept. 15, 1934  3 Sheets-Sheet 1

Inventor
H. Winograd
by
Attorney

Patented May 25, 1937

2,081,844

UNITED STATES PATENT OFFICE 2,081,844

ELECTRIC VALVE CONTROL SYSTEM

Harold Winograd, Milwaukee, Wis., assignor to Allis-Chalmers Manufacturing Company, Milwaukee, Wis., a corporation of Delaware Application September 15, 1934, Serial No. 744,126

9 Claims. (Cl. 175—363)

This invention relates in general to electric valve control systems, and more particularly to means for energizing the control electrode of an electric valve with a plurality of potential components obtained from a single transformer.

In electric translating systems utilizing electric valves, it is frequently desirable to impress superposed alternating and unidirectional potential components on the control electrodes of the valve, the flow of current through the valve then being regulated preferably by varying the magnitude of the unidirectional component. The alternating component may be obtained from a transformer connected with the transformer supplying current to the anodes of the valve, but a unidirectional component of suitable sign and magnitude may generally be obtained only by the use of additional sources such as bias batteries. Such sources have the disadvantage of increasing the cost and the complication of the system and, when the magnitudes of the two components thus obtained are completely independent, any change in the magnitude of the alternating component also changes the characteristics of the valve or, at least, affects the adjustment of the regulating means associated therewith. In addition, if the unidirectional component is obtained from a direct current circuit supplied from the valve, such component can only be of negative sign. By connecting simple and inexpensive rectifying devices with the control electrode transformer, a unidirectional control electrode potential component may be obtained without materially complicating the system or increasing the cost thereof, with the additional advantages that the system is substantially unaffected by changes in the magnitude of the voltage of the transformer and that a positive or negative unidirectional component may be obtained as may be necessary.

It is, therefore, one of the objects of the present invention to provide an electric valve control system in which the control electrodes of the valve receive superposed alternating and unidirectional potential components from a single transformer.

Another object of the present invention is to provide an electric valve control system in which the alternating and unidirectional control electrode potential components are each proportional to the magnitude of the voltage impressed on the control electrode transformer.

Another object of the present invention is to provide an electric valve control system in which the operation of the system is not affected by variations of the magnitude of the voltage impressed on the control electrode transformer.

Another object of the present invention is to provide an electric valve control system in which the control electrode unidirectional potential component may be made either negative or positive.

Another object of the present invention is to provide an electric valve control system in which the operation of the valve may be controlled by acting on an impedance means connected to receive a rectified voltage from the control electrode transformer.

Figure 2:
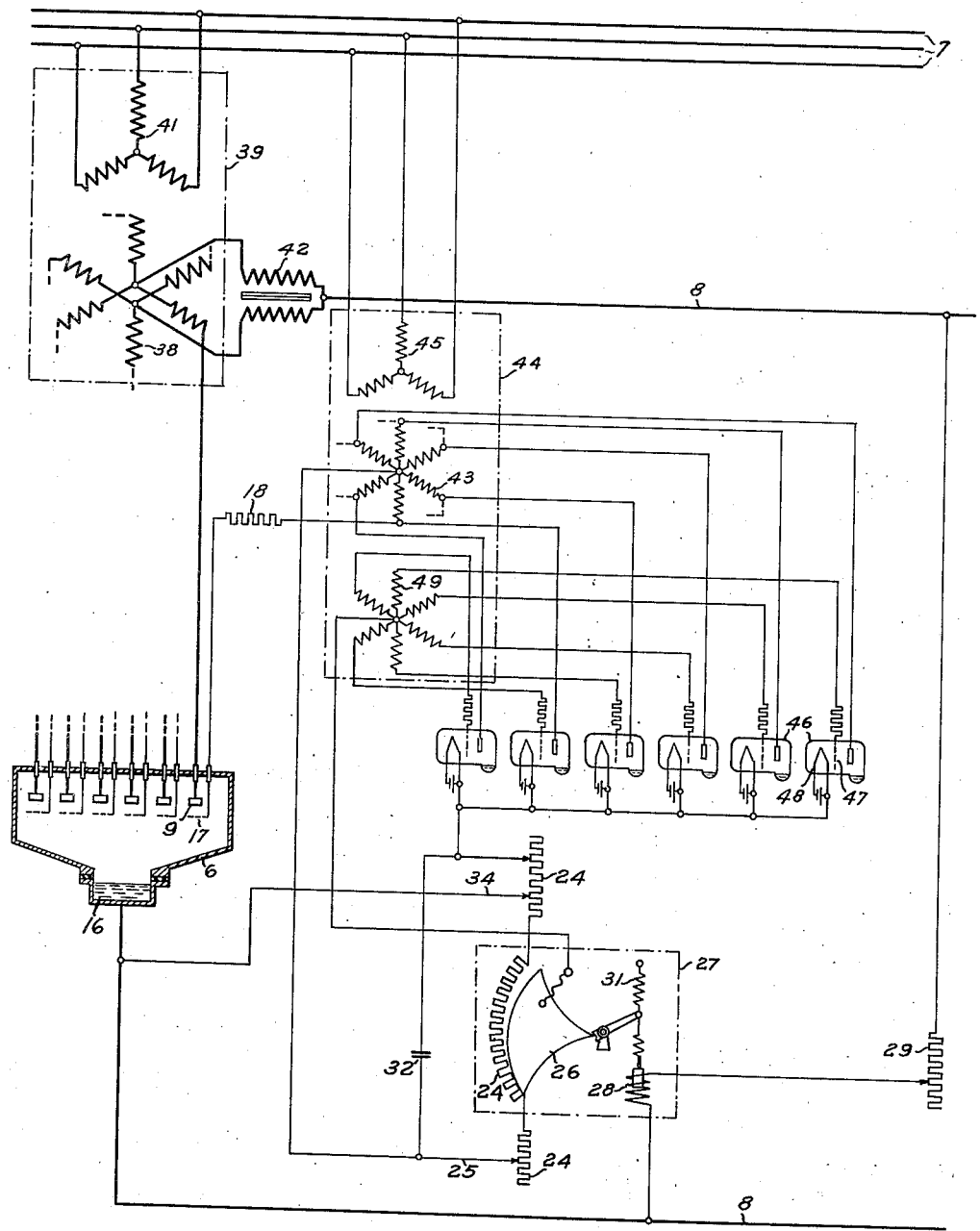
Figure 3:
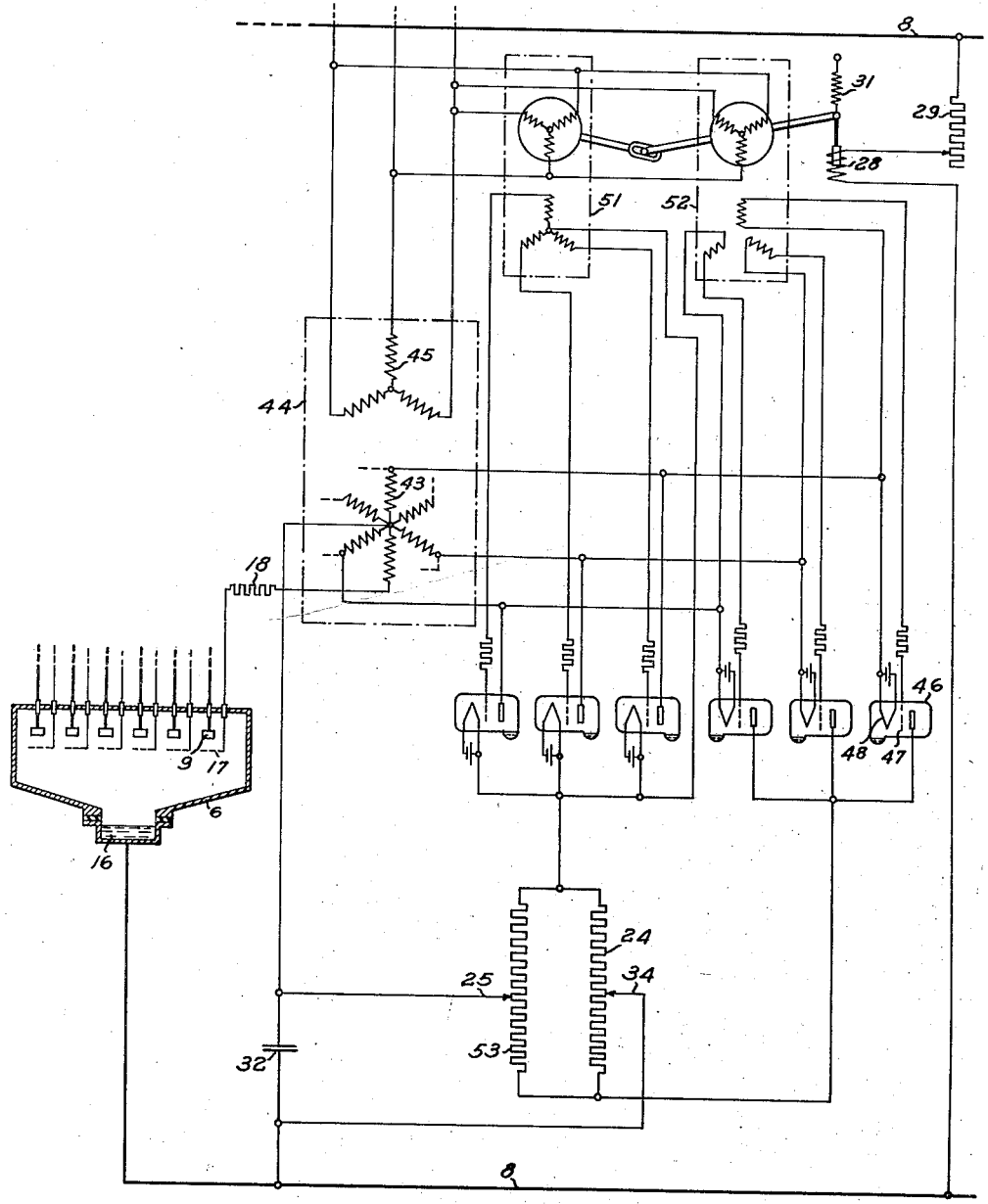

Objects and advantages other than those above described will be apparent from the following description when read in connection with the accompanying drawings in which:

Fig. 1 diagrammatically illustrates one embodiment of the present invention applied to the control of a valve utilized for rectifying single phase currents;

Fig. 2 diagrammatically illustrates a modified embodiment of the present invention applied to the control of a valve utilized for rectifying six phase currents; and Fig. 3 diagrammatically illustrates a further modified embodiment of the present invention differing from the embodiment illustrated in Fig. 2 in the method of controlling the auxiliary valves utilized in the system.

Referring more particularly to the drawings by characters of reference, reference numeral 6 designates an electric valve utilized for controlling the flow of current between an alternating current line 7 and a direct current line 8. It will be assumed that, in Fig. 1, alternating current received from one phase of line 7 is to be rectified and supplied to line 8, and the operation of the system will be described accordingly. It will be understood, however, that the converse operation may be effected by suitable readjustments of the control elements of the system. It will also be understood that the system may be utilized for the control of electric valves forming part of translating systems other than the rectifying systems illustrated in the drawings.

Valve 6 is provided with anodes 9 severally connected with the phase portions of an inductive winding 11 constituting the secondary winding of a transformer 12 having a primary winding 13 connected with line 7, winding 11 being connected with one of the conductors of line 8. Valve 6 may be of any type known in the art in which the discharge may be controlled either continuously or discontinuously, and is represented as being of the type having a reconstructing cathode 16. Valve 6 is also provided with any suitable discharge igniting and maintaining means which are well known in the art, and are therefore not shown.

The flow of current through the anodes of the valve is controlled by means of control electrodes of any suitable type such as grids 17 associated therewith. Each control electrode 17 is connected through suitable impedance means, such as a resistor 18, with a circuit impressing suitable potentials thereon. As the operation of the valve depends on the voltage between the control electrodes and the cathode, cathode 16 is taken as datum for control potentials and the potential of any control electrode of valve 6 is then equal to the voltage impressed between such control electrode and the cathode.

Each control electrode circuit comprises a phase portion of the secondary winding 19 of a control electrode transformer 21 having a primary winding 22 energized from line 7, the connection between resistors 18 and winding 19 including suitable phase shifting means such as resistors 36 and reactors 37, if so desired. As a result of such connection, each portion of winding 19 receives a voltage similar to a voltage of the corresponding portion of winding 11, and impresses an alternating potential component equal to such voltage on the associated control electrode 17. Each anode and the associated control electrode may be connected with portions of windings 11 and 19 respectively having their voltages in phase, or with portions having the voltages thereof out of phase to impress an alternating potential from transformer 21 displaced in phase with respect to the potential impressed on the associated anode by winding 11, on each control electrode.

Suitable rectifying means are connected with transformer 21 for simultaneously impressing a unidirectional potential component therefrom on control electrodes 17. Such means preferably include a plurality of rectifying devices 23 of any suitable type connecting winding 19 with a voltage divider 24 having an intermediate movable tap 26 connected with cathode 16, such tap being movable over the whole or only a portion of the voltage divider as may be desired. To vary the range of adjustment obtainable therewith, voltage divider 24 is variably connected with devices 23, and an adjustable tap 25 of the voltage divider is connected with the neutral point of winding 19. Such adjustable tap also causes the distribution of potential in voltage divider 24 to be substantially unaffected by the magnitude of the flow of control electrode current therethrough. The voltage of the portion of voltage divider 24 engaging with tap 26 may be rendered substantially uniform by suitable means such as capacitors 32 connected across such portion. The neutral point of winding 19 then is maintained at a substantially uniform potential, differing from the potential of cathode 16 by the amount of the voltage drop in the portion of voltage divider 24 comprised between taps 25 and 26. Because the voltage divider is supplied from winding 19, the rectifying devices impress, on the voltage divider, a unidirectional voltage from winding 19 of magnitude directly proportional to the voltage of such winding. The potential of the neutral point of winding 19, which is equal to the unidirectional potential component of control electrode 17, is then also proportional to the voltage of winding 19.

Tap 26 and the associated portion of voltage divider 24 may be incorporated in a regulator 27 to cause movement of the tap automatically in response to changes of an operating condition of valve 6. In the present embodiment tap 26 is actuated by a solenoid 28 energized through a resistor 29 from a shunt 33 inserted in line 8 and acting against a spring 31.

In operation, the system being connected as shown, upon energization of line 7, winding 11 alternately impresses similar periodic potentials on anodes 9, and each anode carries current during the positive potential half cycle thereof. The current through each anode is released approximately at the time at which the associated control electrode becomes positive, such result being obtained when the alternating potential component of the control electrode is positive and becomes greater than the unidirectional component thereof if the latter is negative, or is negative and becomes smaller than such unidirectional component if the latter is positive. The time of release of the anode current thus depends on the sign and magnitude of the unidirectional control electrode potential component. Such components each being proportional to the magnitude of the voltage of line 7, their ratio is independent of any variations in the magnitude of such voltage, and the operation of valve 6 is unaffected by such variations.

When regulator 27 is in the position shown, such unidirectional component is positive and equal to the voltage drop in the portion of the voltage divider comprised between the two taps thereof. The control electrode then becomes positive at the earliest possible part of the cycle consistent with the adjustment of the system, and the flow of current is released through each anode at the earliest possible part of the cycle to cause the voltage of line 8 to be at the maximum value thereof. If the magnitude of the current in line 8 exceeds the value for which regulator 27 is adjusted, the action of solenoid 28 overcomes the action of spring 31 to cause movement of tap 26. The positive unidirectional control electrode voltage component is then decreased or even reversed in sign depending upon the extent of movement of tap 26, and each control electrode becomes positive at a later point of the voltage cycle of the anode, with the result that the voltage of line 8 decreases. The movement of tap 26 continues until the current of line 8 is returned to a variable or constant value depending upon the setting of rheostat 29 and upon the characteristics of solenoid 28 and of spring 31. If the current in line 8 is lower than such value, spring 31 returns tap 26 towards the position shown against the action of solenoid 28.

When tap 26 may engage with voltage divider 24 on either side of tap 25 as shown in Fig. 1, the unidirectional control electrode potential component may take either positive or negative values. It will be understood, however, that the range of such component may be narrowed down to either only positive or only negative values by moving tap 25 to one or the other end of the mid portion of voltage divider 24. With such adjustment, only half of the rectifying devices 23 are useful and the other half may be omitted.

In the embodiment illustrated in Fig. 2, valve 6 is illustrated as being provided with a plurality of anodes severally connected with the phase displaced portions of the secondary winding 38 of a polyphase transformer 39 having a primary winding 41 connected with line 7. Winding 38 may be connected with one of the conductors of line 8 either directly or through an interphase transformer 42, as is well known in the art. The control voltage components for the control electrodes 17 of valve 6 are obtained from the secondary winding 43 of a polyphase auxiliary transformer 44 having a primary winding 45 connected with line 7. Each anode 9 and the associated control electrode 17 are connected with portions of windings 38 and 43 respectively, of which the voltages are in phase coincidence or displaced in phase with respect to each other as may be desired.

In the present embodiment, valves 23, as shown in Fig. 1, are replaced by a plurality of controllable auxiliary valves 46, and voltage divider 24 is connected between the cathodes 48 of valves 46 and the neutral point of winding 43. Cathode 16 may be connected with the cathodes 48 of valves 46 or may be connected at an intermediate point of voltage divider 24 by means of an adjustable tap 34. Each valve 46 is provided with a control electrode 47 connected with the associated cathode 48 through a circuit including one of the phase displaced portions of a winding 49, the neutral point of such winding, tap 26 and voltage divider 24. Winding 49 may be energized from line 7 in any suitable manner, for example, by connecting winding 49 inductively with windings 43 and 45 of transformer 44. The system illustrated in the present embodiment is utilized for regulating the voltage of line 8 by connecting solenoid 28 and rheostat 29 between the two conductors of such line.

In operation, the system being connected as shown in the drawings, upon energization of line 7 winding 38 sequentially impresses similar periodic potentials on the several anodes 9 of valve 6, and each anode begins to carry current during the positive voltage half cycle thereof provided that such anode is at a more positive potential than the previously operating anode. As was set forth above with respect to the embodiment illustrated in Fig. 1, the flow of current through each anode is released approximately when the two voltage components impressed on the associated control electrode by winding 43 and voltage divider 24 cause the potential of such control electrode to pass from a negative value to a positive value. In the present embodiment, the connections of voltage divider 24 are such that these unidirectional voltage components may only be given negative values of magnitude depending upon the moment of the voltage cycle at which current is released to the several valves 46. Such moments are determined by the phase relation between the voltages of associated portions of windings 43 and 49 and by the relative magnitude of the voltages of winding 49 and of the unidirectional voltage component impressed between cathodes 48 and control electrodes 47 by means of voltage divider 24 and tap 26.

When tap 26 is in the position shown, the unidirectional voltage component impressed between cathodes 48 and control electrodes 47 is the greatest possible portion of the voltage impressed on voltage divider 24 from winding 43 through valves 46. Control electrode 47 therefore becomes positive with respect to the associated cathodes 48 at the latest possible time in the voltage cycle of line 7, and the voltage impressed on voltage divider 24 is at a minimum value. The negative voltage component of control electrodes 17, which is equal to the voltage between taps 25 and 34, is therefore also at a minimum value, and each control electrode 17 becomes positive with respect to cathode 16 at the earliest possible time in the voltage cycle of line 7, thereby releasing the flow of current through the associated anodes of valve 6 in a manner causing the impression of a maximum voltage on line 8.

If such line voltage is higher than the value for which regulator 27 is adjusted, solenoid 28 overcomes the action of spring 31 to move tap 26 away from the position shown in the drawings. Such action causes the unidirectional voltage component of control electrodes 47 to decrease, and the flow of current through valves 46 is released at an earlier time in the voltage cycle. The voltage impressed on voltage divider 24 accordingly increases, thereby increasing the unidirectional voltage component of control electrodes 17. Such action causes control electrodes 17 to become positive at a later instant in the voltage cycle, whereby the voltage of line 8 is reduced to an extent such that the actions of solenoid 28 and of spring 31 become balanced, and tap 26 is maintained in the position reached thereby. If the voltage of line 8 is below the value for which regulator 27 is adjusted, the voltage will be restored to the desired value by a process opposite to that above described.

In the embodiment illustrated in Fig. 3, the connections of one-half of valves 46 with winding 23 and with voltage divider 24 were changed to cause the terminals of voltage divider 24 to be at opposite polarities with respect to the neutral point of winding 43. The valves are then connected in pairs, the anodes of one valve of each pair being connected with the cathode of the other valve of the pair, and the connected anodes and cathodes of the pair being connected to the two terminals of the voltage divider. Cathode 16 is again connected with voltage divider 24 through a tap 34, and the neutral point of winding 43 is preferably connected through tap 25 with a second voltage divider 49 connected in parallel with voltage divider 24. In the present embodiment, each control electrode 47 is energized at only an alternating potential with respect to the associated cathode 48, the several control electrodes being energized through phase shifters 51 and 52 connected with line 7. Solenoid 28 is utilized to vary the positions of the rotors of the phase shifters and to thus vary the phase relation between the voltages of the phase shifters and of winding 43 to control the flow of current through valves 46. Each phase shifter controls the operation of a group of valves connected with one of the terminals of voltage divider 24, and the connections between the phase shifter rotors are preferably such that when the output voltages of one phase shifter are advanced, the output voltages of the other phase shifter are retarded.

Phase shifters 51 and 52 being in the position shown, the voltages of the control electrodes of the valves connected with the upper terminal of the voltage dividers are retarded to the greatest possible extent, so that a minimum voltage is impressed on the upper part of voltage divider 53. The voltages of the control electrodes of the remaining valves are, on the contrary, advanced to the greatest possible extent so that the voltage impressed on the lower part of voltage divider 53 is at a maximum value. As a result of such action, tap 25 is at a maximum positive potential with respect to tap 34, and a maximum positive unidirectional component is impressed on control electrodes 17 to regulate the output voltage of valve 6 at a maximum value.

If the output voltage of line 8 exceeds the value for which solenoid 28 and spring 31 are adjusted, the phase shifters are moved away from the position shown to cause the voltage impressed on the upper portion of voltage divider 53 to increase, and to cause the voltage impressed on the lower portion of such voltage divider to decrease. The unidirectional voltage component of control electrodes 17 is thereby reduced in magnitude or even reversed in sign, depending on the extent of movement of phase shifters 51 and 52, to cause the voltage of line 8 to be regulated to a value at which solenoid 28 and spring 31 maintain the phase shifters in equilibrium. If the voltage of line 8 is below the value for which solenoid is adjusted, such voltage will be regulated by a process opposite to that above described.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric translating system, an electric valve having an anode with an associated control electrode and a cathode, a circuit for energizing said control electrode and including a transformer having a secondary winding connected with said control electrode, a voltage divider connected with said cathode, rectifying means connecting said voltage divider with said winding, and means responsive to an operating condition of said valve for varying the connection of said voltage divider with said cathode.

2. In an electric translating system, an electric valve having an anode with an associated control electrode and a cathode, an inductive winding connected with said anode and impressing a periodic potential thereon, a transformer connected with said winding, means for impressing on said control electrode a potential from said transformer displaced in phase with respect to the potential impressed on said anode by said winding, rectifying means connected with said transformer for simultaneously impressing a unidirectional potential component therefrom on said control electrode, means for rendering said unidirectional potential substantially uniform, and means responsive to an operating condition of said valve for varying the magnitude of the unidirectional potential to regulate the flow of current through said valve.

3. In an electric translating system, an electric valve having an anode with an associated control electrode and a cathode, a circuit for energizing said control electrode and including a transformer secondary winding, a voltage divider connected with said cathode, an auxiliary electric valve connecting said voltage divider with said winding, and means for controlling the conductivity of said auxiliary valve.

4. In an electric translating system, an electric valve having an anode with an associated control electrode and a cathode, a circuit for energizing said control electrode and including a transformer secondary winding, a voltage divider connected with said cathode, an auxiliary electric valve connecting said voltage divider with said winding, and means responsive to an operating condition of the first said valve for controlling the conductivity of said auxiliary valve.

5. In an electric translating system, an electric valve having an anode with an associated control electrode and a cathode, a circuit for energizing said control electrode and including a transformer secondary winding, a voltage divider connected with said cathode, an auxiliary electric valve connecting said voltage divider with said winding, said auxiliary valve having an anode with an associated control electrode and a cathode, and a control electrode circuit for the second said valve and including a winding connected with the first said winding and conductively connected with the second said control electrode and with said voltage divider.

6. In an electric translating system, an electric valve having an anode with an associated control electrode and a cathode, a circuit for energizing said control electrode and including a transformer secondary winding, a voltage divider connected with said cathode, an auxiliary electric valve connecting said voltage divider with said winding, said auxiliary valve having an anode with an associated control electrode and a cathode, and a control electrode circuit for the second said valve including a winding connected with the first said winding and conductively connected with the second said control electrode and with said voltage divider, and means responsive to an operating condition of the first said valve for varying the connection of the second said winding with said voltage divider.

7. In an electric translating system, an electric valve having an anode with an associated control electrode and a cathode, a circuit for energizing said control electrode and including a transformer secondary winding, a voltage divider connected with said cathode, a pair of auxiliary electric valves connecting said voltage divider with said winding, and means for simultaneously and inversely varying the conductivities of said auxiliary valves to vary the unidirectional voltage transmitted to the first said circuit by said voltage divider.

8. In an electric translating system, an electric valve having an anode with an associated control electrode and a cathode, a circuit for energizing said control electrode and including a transformer secondary winding, a voltage divider connected with said cathode, a second voltage divider connected in parallel with the first said voltage divider and having a tap connected with said winding, a pair of auxiliary electric valves connecting said voltage dividers with said winding and each having a control electrode, control electrode circuits for said auxiliary valves, and means for simultaneously varying the adjustment of the last said control electrode circuits to vary the potential of the said tap of the second said voltage divider.

9. In an electric current translating system, the combination with an alternating current supply circuit, an electric current load circuit, and an electric valve interconnecting said circuits and having an electrode for controlling the flow of current therebetween, of means for exciting said electrode in such sense as to thereby control the moments of initiation of said flow of current and to regulate the magnitude thereof comprising means connecting the first said circuit with said electrode for impressing alternating potential on the latter, means comprising an auxiliary electric valve having connection with said electrode for impressing a unidirectional potential component on the latter, and additional means operable responsive to and in dependence upon variations in the magnitude of voltage of said output circuit for varying the magnitude of said unidirectional potential component.

HAROLD WINOGRAD.